W. H. HOLDER.
GLASS OR MIRROR FASTENER.
APPLICATION FILED DEC. 16, 1914.
1,155,924.
Patented Oct. 5, 1915.
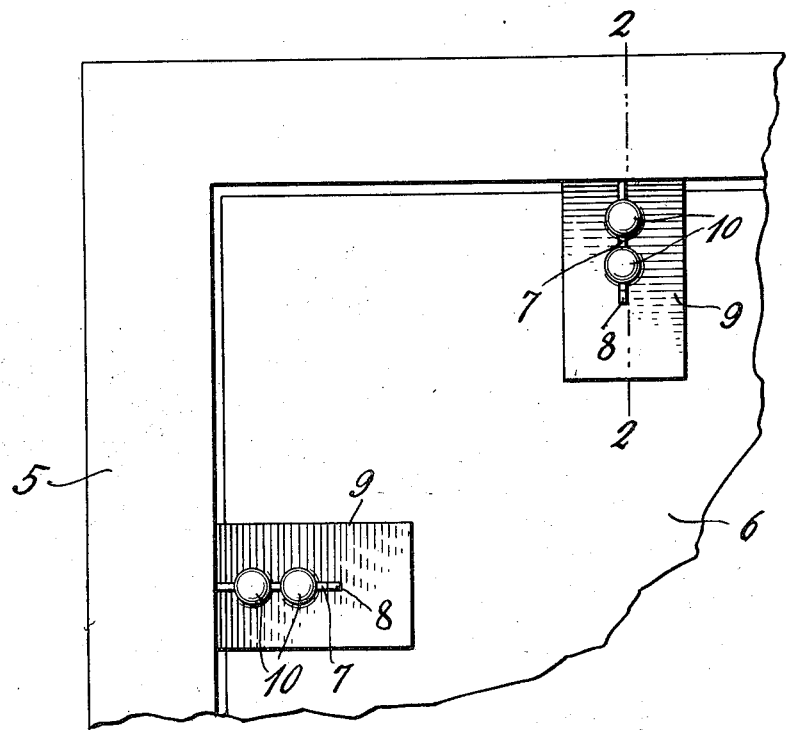
Fig. 1.
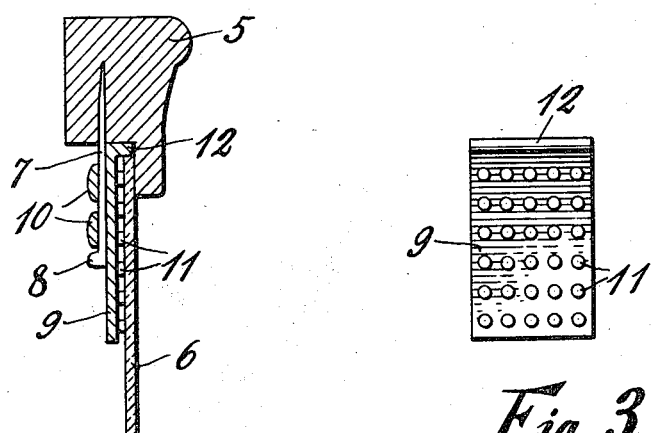
Fig. 2.
Fig. 3.
Witnesses
Einar Larsson
E. F. Camp
Inventor
William H. Holder

UNITED STATES PATENT OFFICE.

WILLIAM H. HOLDER, OF SCRANTON, PENNSYLVANIA.

GLASS OR MIRROR FASTENER.

1,155,924.  Specification of Letters Patent.  Patented Oct. 5, 1915.

Application filed December 16, 1914. Serial No. 877,540.

*To all whom it may concern:*

Be it known that I, WILLIAM H. HOLDER, a citizen of the United States, residing at Scranton, in the county of Lackawanna and State of Pennsylvania, have invented certain new and useful Improvements in Glass or Mirror Fasteners, of which the following is a specification.

The fastener which is the subject matter of the present application for patent, is designed for the purpose of fastening mirrors and picture frame glasses in their frames, and its object is to provide a simple, cheap and durable fastener by which the mirror or other glass can be easily and quickly mounted and fastened in the frame, the glass being securely held, and the fastener also being constructed to take up any looseness of the glass if the latter is not of the exact size of the frame.

These objects are attained by means of a novel combination and arrangement of parts to be hereinafter described and claimed, reference being had to the accompanying drawing, in which—

Figure 1 is an elevation showing the application of the invention, a fragment only of the picture or mirror frame being shown; Fig. 2 is a cross-section on the line 2—2 of Fig. 1, and Fig. 3 is an inner face view of the fastener.

Referring specifically to the drawing, 5 denotes a picture or mirror frame, and 6 indicates the glass to be secured in said frame. The fastener for securing the glass is a nail or similar driven fastener 7 pointed at one end and having at its other end a head 8. This fastener is carried by a rectangular supporting plate 9 having on one of its faces lugs 10 provided with alined transverse apertures through which the fastener passes and in which it is slidable. The other face or side of the plate is roughened by small protuberances or corrugations, as indicated at 11, and one of the edges of the plate has an outstanding marginal bead 12, the same being for a purpose to be presently made clear.

In use, the glass 6 being mounted in the frame 5, the plate 9 is placed against the back of the glass adjacent to the edge thereof, with the pointed end of the fastener 7 opposite the inner edge of the frame. The fastener is then advanced and forced into the frame, which completes the operation. Thus it will be seen that the glass can be easily and quickly fastened in the frame. Any suitable number of the devices are employed, according to the size of the glass and its frame. By the plate 9 a wide bearing on the glass is obtained. The roughened side of the plate 9 forms a cushion and air chambers, this side of the plate being in contact with the glass, thereby preventing breakage when pressed against the glass. The fastener 7 is driven straight and true, it being guided by the apertures in the lugs 10. If the glass is smaller than the frame, the bead 12 is placed between the edge of the glass and the inner edge of the frame, which takes up looseness and prevents rattling of the glass.

By means of the fastening device the glass can be quickly set in a substantial manner, and with greater safety than by the means generally employed, and in the shipment of large packages of framed pictures breakage is reduced to a minimum. The plates 9 will be formed with beads 12 of various thicknesses to take up different degrees of looseness of the glass, and said plates may be made of any desired or suitable material. The protuberances of the corrugations 11 are more flexible or softer than the body portion of the plate 9, in order to prevent marring of the glass.

I claim:—

A fastener for securing a glass in a frame, comprising a plate adapted to be seated against the back of the glass, and having a marginal bead adapted to fit between the edge of the glass and the opposite edge of the frame, and a slidable driven fastener carried by the plate and extending lengthwise thereof to project from the beaded end of the plate, said fastener being adapted to be driven into the aforesaid edge of the frame between which and the edge of the glass the marginal bead fits.

In testimony whereof I affix my signature in presence of two witnesses.

WILLIAM H. HOLDER.

Witnesses:
W. F. VAUGHAN,
H. H. HOLDER.